(12) United States Patent
Warren

(10) Patent No.: US 12,527,477 B2
(45) Date of Patent: Jan. 20, 2026

(54) PERSONALIZED NEUROPLASTIC BREATH TRAINING

(71) Applicant: Halare, Inc., Sewickley, PA (US)

(72) Inventor: Anthony C. Warren, Vienna (AT)

(73) Assignee: Halare, Inc., Sewickley, PA (US)

( * ) Notice: Subject to any disclaimer, the term of this patent is extended or adjusted under 35 U.S.C. 154(b) by 354 days.

(21) Appl. No.: 18/129,940

(22) Filed: Apr. 3, 2023

(65) Prior Publication Data

US 2023/0355104 A1     Nov. 9, 2023

Related U.S. Application Data

(60) Provisional application No. 63/338,084, filed on May 4, 2022.

(51) Int. Cl.
| | | |
|---|---|---|
| *A61B 5/02* | (2006.01) | |
| *A61B 5/00* | (2006.01) | |
| *G16H 40/60* | (2018.01) | |

(52) U.S. Cl.
CPC .............. *A61B 5/02* (2013.01); *A61B 5/4806* (2013.01); *G16H 40/60* (2018.01)

(58) Field of Classification Search
None
See application file for complete search history.

(56) References Cited

U.S. PATENT DOCUMENTS

| | | | |
|---|---|---|---|
| 10,219,740 B2* | 3/2019 | Warren | ............... A61B 5/7275 |
| 2025/0040830 A1* | 2/2025 | Weydert | ............... A61B 5/486 |

* cited by examiner

*Primary Examiner* — George R Evanisko
(74) *Attorney, Agent, or Firm* — DLA Piper LLP (US)

(57) ABSTRACT

A portable smart device including a coupled sensor sensing a physiological parameter of a user, and a processor. The processor is configured to perform a breath training session by instructing the user to breath in a specified manner, receiving physiological data from the sensor, the physiological data representing the sensed physiological parameter of a user, determining a breathing quality based on the physiological data from the sensor, and stopping the breath training when the breathing quality reaches a breath training session stopping threshold. The processor is further configured to evaluate initiation of a further breath training session by receiving the physiological data from the sensor while the user is sleeping, and repeating the breath training session in response to the physiological data from the sensor indicating that the breathing quality reaches a breath training session starting threshold.

8 Claims, 11 Drawing Sheets

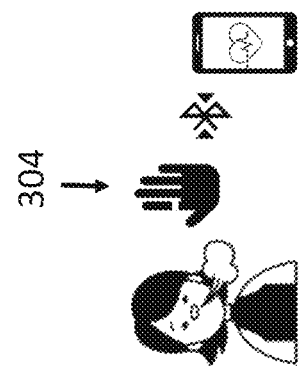
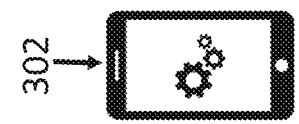
FIGURE 3a
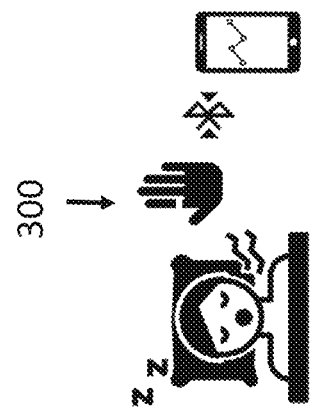

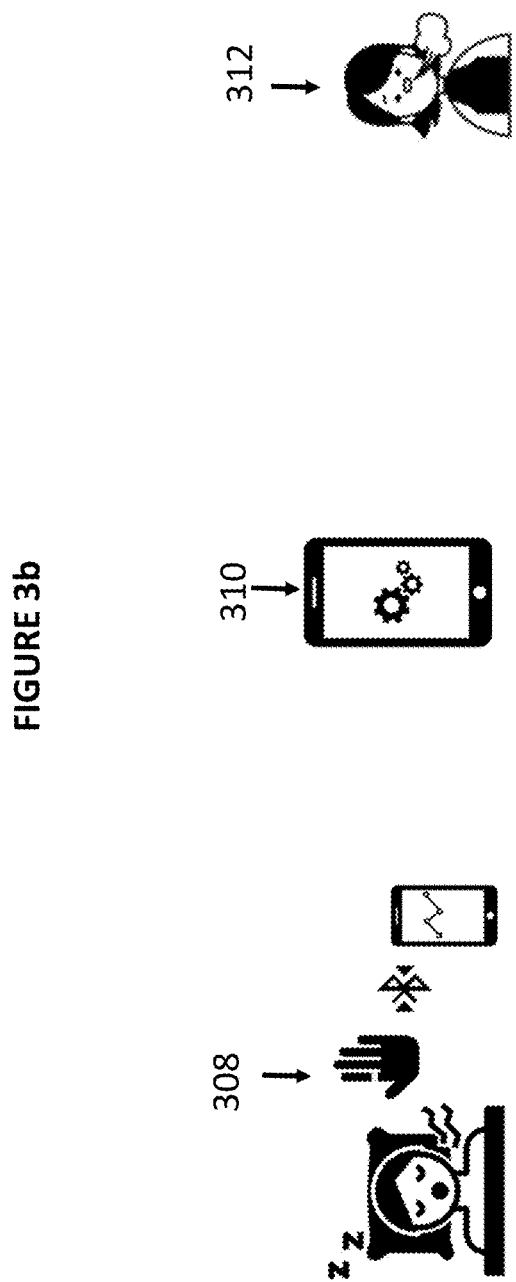

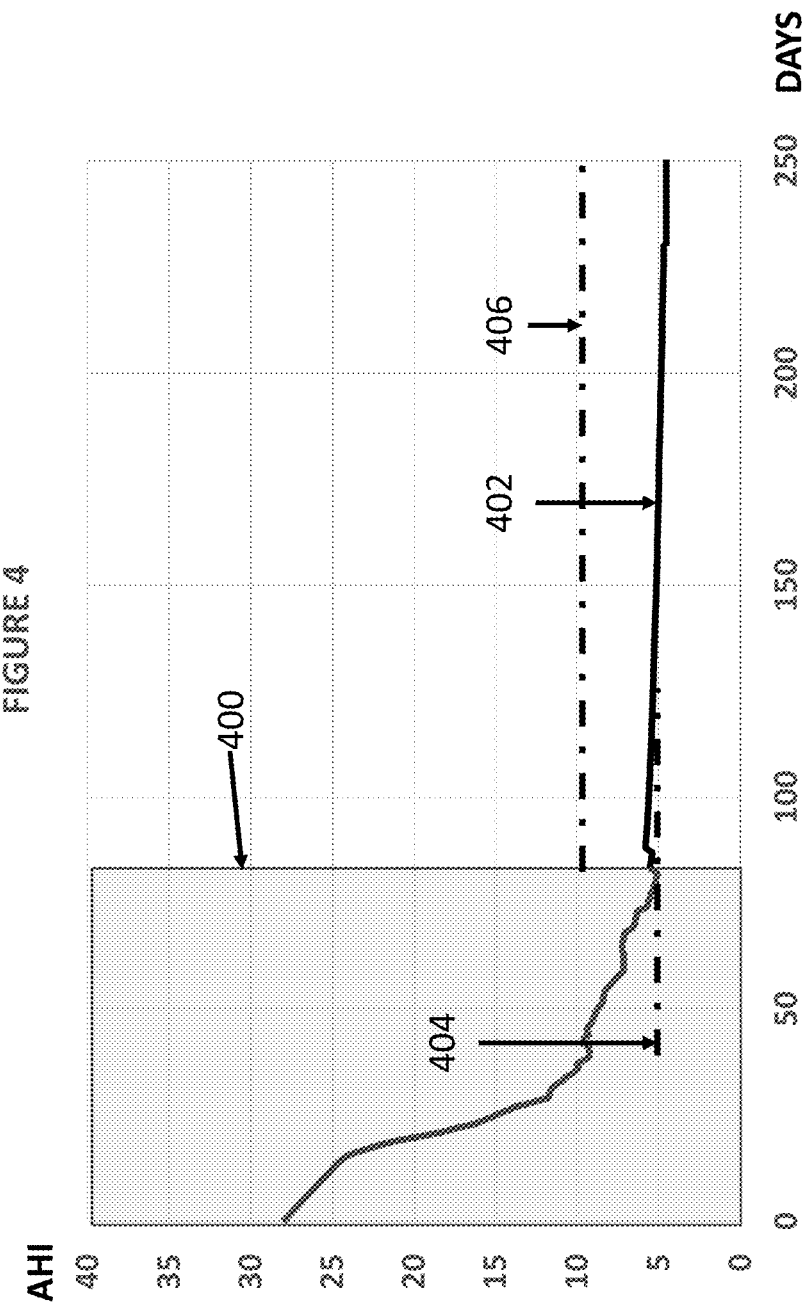

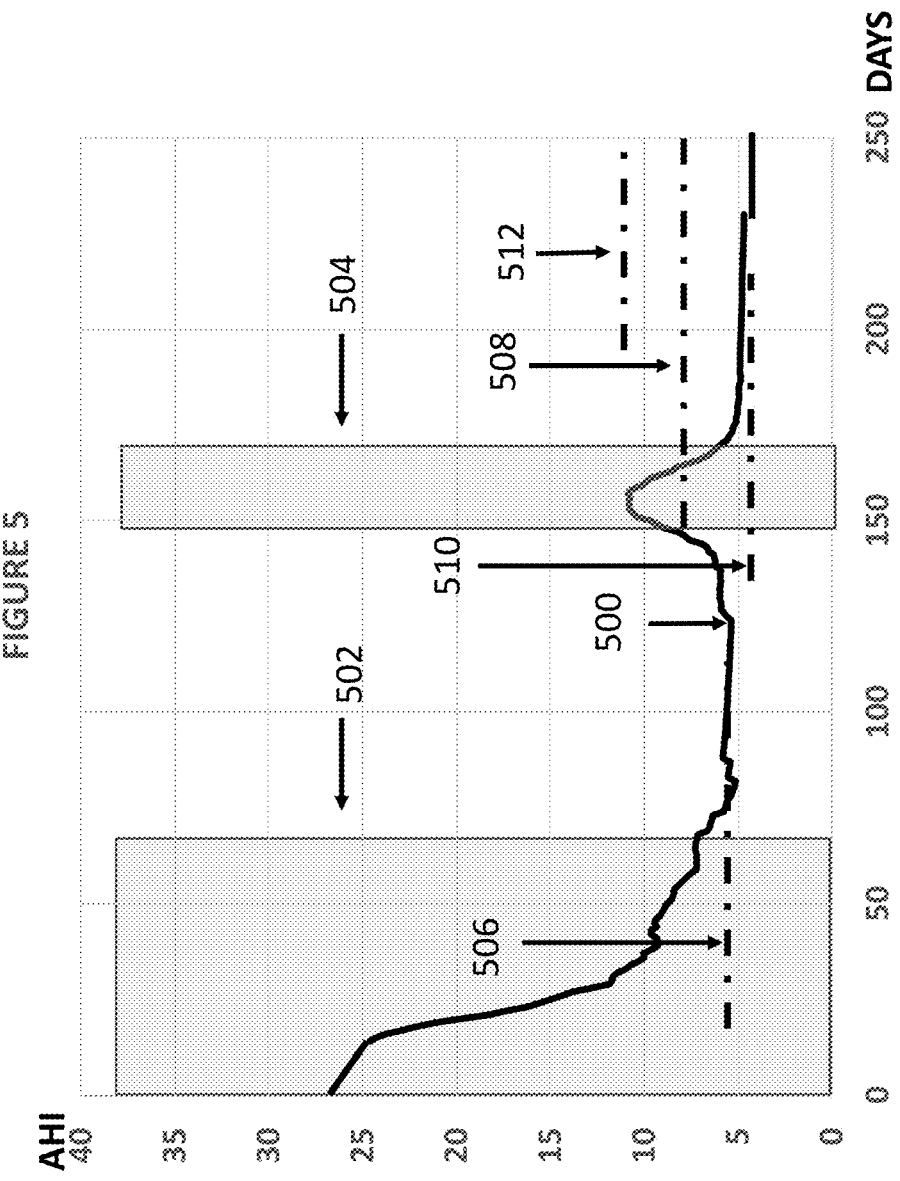

FIGURE 8

| Course no | Start AHI | 1st Target AHI $V_{1lower}$ |
|---|---|---|
| 1 | >40 | 25 |
| 2 | 35-40 | 20 |
| 3 | 30-40 | 17 |
| 4 | 20-30 | 13 |
| 5 | 10-20 | 7 |
| 6 | <10 | 4 |

FIGURE 10

| |
|---|
| Step 1: Breathe normally for 3 minutes. Try to keep the mouth closed. |
| Step 2: Breathe normally, then when prompted hold the breath after exhaling until the first clear urge to breathe is felt. Then take the first breath in through the nose calmly. Try not to gasp. (This is a self-imposed hypoxic event). |
| Step 3: Breathe normally for approximately five minutes, until prompted to hold the breath after breathing out. Hold the breath until the first clear urge to breathe is felt. Then take the first breath through the nose calmly. Try not to gasp. (This is the second self-imposed hypoxic event). |
| Step 4: From normal breathing, when prompted, gradually slow down until breathing is as slow as comfortable. Aim for about 6 breaths per minute. Count in for 4 seconds and out for 6 seconds. |
| Step 5: From slow breathing, exhale, hold the breath until a strong need to breathe is felt. (This is the third self-imposed hypoxic event). |
| Step 6: Repeat steps 3,4,5 in sequence 2 or 3 times. |
| Step 7: Breathe normally for 3 minutes to relax. Keep the mouth closed. |

PERSONALIZED NEUROPLASTIC BREATH TRAINING

FIELD

The present disclosure relates to systems, methods and apparatuses for aiding trainees to alleviate symptoms of sleep disordered breathing (SDB).

BACKGROUND

A significant proportion of Sleep Disordered Breathing (SDB) relates to a condition characterized by repeated episodes of hypopnea (under-breathing) and apnea (not breathing) during sleep resulting in reduction in blood oxygen saturation ($SpO_2$), arousal from sleep and sympathetic nervous system activation. Pauses may last 10-20 seconds or more and can occur 20 to 30 times or more an hour. The most common type of SDB affecting approximately 85% of trainees is referred to as Obstructive Sleep Apnea (OSA) in which physical obstruction of the airways occurs due to sleep related loss of upper airway dilator muscle tone. A second type of SDB, commonly referred to as Central Nervous System Apnea (CNSA) is less common and occurs when the brain region that controls breathing fails to send signals to breathing muscles in a timely manner. It is now generally accepted that CNSA often occurs in combination with OSA and that the historical separation of OSA and CNSA insufficiently categorizes the disease forms and therapies.

In general, SDB can have major short-term and long-term deleterious impacts. When sleep is interrupted throughout the night, drowsiness occurs during the day. People with SDB have twice the risk for car accidents, are 25% more likely to have at-work accidents and exhibit loss of work efficiency. SDB may also lead to long-term serious, chronic health issues, such as increased chance of stroke and other cardio-vascular diseases, and dementia. Roughly 38,000 cardiovascular deaths annually are in some way related to SDB.

SDB may be un-diagnosed in many cases until symptoms have become life threatening. Estimates are between twelve and twenty million Americans alone suffer from SDB. The economic impact of SDB in the US alone is estimated to be several billion dollars annually, which does not take into account the cost of long-term care associated with other chronic diseases triggered by SDB.

SUMMARY

In an example, the disclosure includes a portable smart device including a coupled sensor sensing a physiological parameter of a user, and a processor. The processor is configured to perform a breath training session by instructing the user to breath in a specified manner, receiving physiological data from the sensor, the physiological data representing the sensed physiological parameter of a user, determining a breathing quality based on the physiological data from the sensor, and stopping the breath training when the breathing quality reaches a breath training session stopping threshold. The processor is further configured to evaluate initiation of a further breath training session by receiving the physiological data from the sensor while the user is sleeping, and repeating the breath training session in response to the physiological data from the sensor indicating that the breathing quality reaches a breath training session starting threshold.

In an example of the disclosure, the sensor is at least one of a heart rate sensor or a blood oxygen saturation sensor.

In an example of the disclosure, the sensor is integrated directly into the portable smart device.

In an example of the disclosure, the sensor is external to and in communication with the portable smart device.

In an example of the disclosure, the processor is further configured to decrease the breath training session stopping threshold and the breath training session starting threshold each time the breath training session is repeated.

In an example of the disclosure, the processor is further configured to decrease a duration each time the breath training session is repeated.

In an example of the disclosure, the processor is further configured to perform the breath training session by instructing the user to breath in a specified manner by performing breath holds and rhythmic breathing patterns.

In an example of the disclosure, the processor is further configured to set a duration of the breath training session, set the breath training session stopping threshold, and set the breath training session starting threshold based on at least one of an inactive duration between breath training sessions and a measured decrease in the breathing quality over the inactive duration.

In an example of the disclosure, the processor is further configured to set a duration of the breath training session, set the breath training session stopping threshold, and set the breath training session starting threshold based on a phenotype classification of the user.

In an example of the disclosure, the processor is further configured to compute the breathing quality as an Apnea-Hypopnea Index (AHI), Oxygen Desaturation Index (ODI), or a Respiratory Disturbance Index (RDI) computed based on the physiological data from the sensor.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3a, shows an example of a wearable ring device being used for both monitoring sleep patterns and guiding breath training, according to an aspect of the disclosure.

FIG. 3b, shows a wearable ring device employed for sleep monitoring, according to an aspect of the disclosure.

FIG. 4 shows the reduction in AHI resulting from 84 days of personalized breath training, according to an aspect of the disclosure.

FIG. 5 shows two separate breath training stages for reducing AHI resulting from two sequences of 60 and 20 days of personalized breath training, according to an aspect of the disclosure.

FIG. 8 shows an example of a look-up table for initial targets, according to an aspect of the disclosure.

FIG. 10 shows instructions for a breath training session to alleviate SDB, according to an aspect of the disclosure.

DETAILED DESCRIPTION

Figure 1:
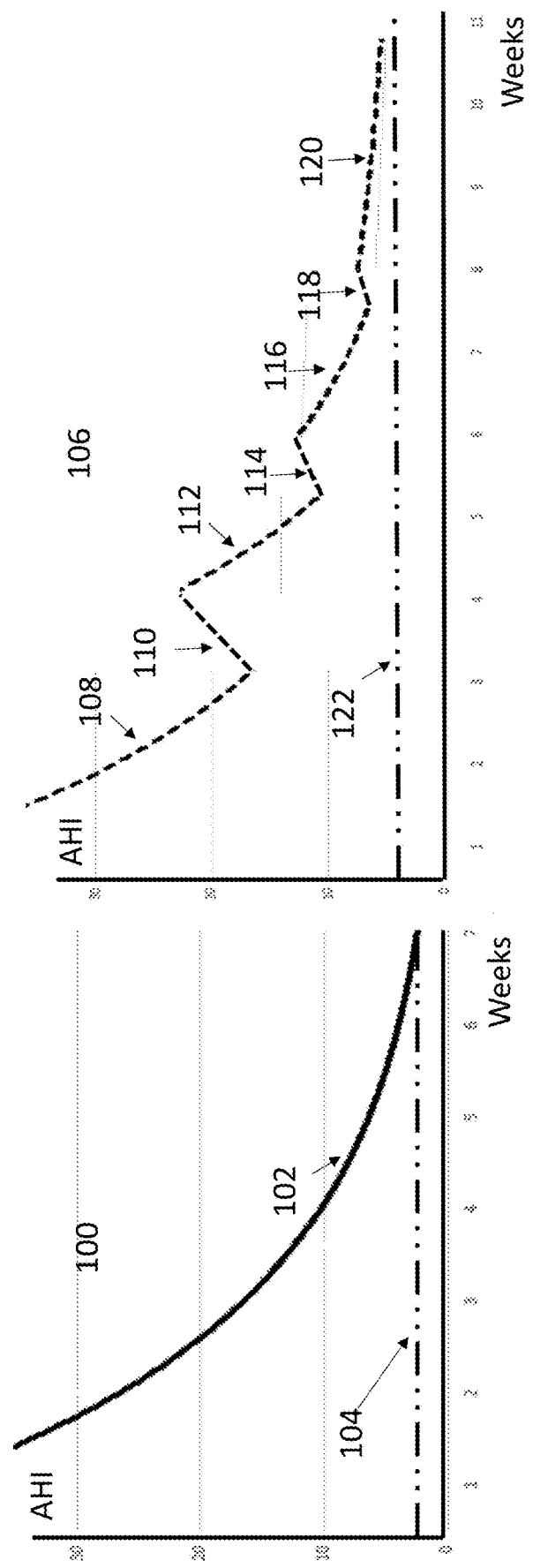
FIG. 1 compares reduction of a commonly used sleep parameter, AHI, using a continuous breathing regimen and a staged exercise regimen, according to an aspect of the disclosure.

Breathing control in humans is a complex system and is controlled from different locations in the brain. It is possible to modify breathing patterns when conscious, for example by voluntarily stopping breathing, breathing more slowly, deeper etc. These actions are controlled within the motor cortex which resides at the top of the brain. However, when asleep, or not voluntarily modifying one's breathing patterns, autonomous breathing control takes over; humans continue to breathe naturally to maintain homeostasis while asleep. Autonomous breathing is controlled primarily from the medulla oblongata, a primitive part of the brain located at the brain stem.

There is evidence that these two control centers can interact. For example, it has been shown that prompting small gradual changes in breathing rate are retained when the prompts are removed. Volitional modifications can alter subsequent autonomous control.

Imposing carefully designed hypoxia sequences may invoke neuroplastic changes in the breathing control centers in the brain that can mitigate the periodic apneas and hypopneas that occur in OSA and CNSA.

Thus, certain breathing exercises performed when awake can modify the neural pathways that control autonomous breathing patterns during sleep and thereby reduce or eliminate the occurrence of sleep disturbed breathing, including snoring and sleep apnea events.

Neuroplastic changes in the autonomous breathing control center require regular breathing exercises over a period of several weeks before new behaviors are fully developed to provide long-term retention of new autonomous breathing patterns.

Typically for such exercises to be fully effective, breath training exercises of the appropriate type are undertaken for up to, or more than, twenty minutes daily for twelve or more weeks. If the exercises are curtailed during this time, it is likely that there will be a reversion towards the original status. Even after a full twelve weeks of rigorous training, there may be a reversion after a longer period, say after several months.

Thus, it is important that a trainee complies closely with the training regimen for the sleep improvement to be maintained over a long term. This demands extreme diligence in following the training regimen by the trainee and some trainees inevitably curtail their breath training before the necessary period of up to, or even beyond, the 12 weeks duration has been reached, thereby not achieving the maximum potential benefit.

Neuroplastic modification of the autonomous breathing control center using breath training can provide noticeable improvements over just 7-10 days. Thus, a trainee may be tempted to stop training after this limited period which may be too short to establish long-term benefits. When the training is stopped at an early stage, a regression towards the original status is likely and undesirable. If additional breath training is recommenced at the stage when reversion towards the original status commences, benefits are likely to be acquired quicker and last longer than the previous training efforts thus making it easier for the trainee to comply.

Breaking the training down into two or more shorter phases may enable a trainee that finds it difficult to comply over a longer period to attain the full benefit of breath training even though it takes a longer time overall to reach the same target. Referring to FIG. 1, chart 100 shows how one of the standard sleep quality parameters, apnea-hypopnia index (AHI) 102, can decline from a high value of 35 to a target value 104, of <0.5 if a diligent trainee undertakes breath training most days for 50 days to attain full benefit. Chart 106 shows how a less diligent trainee may require four phases (108, 112, 116 and 120) of for example 16, 13, 10 and 10 days with 3 interphase breaks of 7 days each (110, 114, 116, and 120) to reach AHI<5, 122, to gain full benefit, a total lapsed time of 11 weeks compared with 7 weeks in chart 100.

The disclosed devices and methods described herein use these unique properties of neuroplastic modification of the breathing control centers in the brain to create long-term retained benefits while reducing the need for long-term continuous compliance. The methods described herein may be applied to various breath training regimens that employ neuroplastic modifications including, but not limited to, SDB alleviation, anxiety and PTSD relief, pain management, and meditation training.

Neuroplastic modification can be compared with muscle training, the behavior being described as 'use it or lose it'. Muscle training is difficult at first, but benefits soon accrue. If the training is interrupted, there is loss of muscle tone which, however, can be recouped in a relatively shorter time and less effort at a later date than during the first training efforts. Discontinuing training for an extended period requires greater effort to re-establish muscle function, or in the cases described herein, breathing control.

A portable smart sensing device designed to be held by a trainee or worn by a trainee may be used for multiple functions. An associated processor of these devices or of a host device in communication with these devices is configured to receive and analyze physiological parameter values from such smart sensing devices during one or both of these functions, a) a breath training session, and b) sleep session.

In the first function a), the portable smart device determines breathing quality of a trainee during a breath training session. The portable smart device includes one or more sensors configured to detect physiological parameter values of the trainee during the breath training session and a processor coupled to the one or more sensors.

In the second function, b), the same or a second portable smart device designed to be held by a trainee or worn by a trainee determines the occurrence of apnea or hypopnea events during sleep.

The same or identical portable sensing device may be used for both functions, a) and b) for convenience. However, the benefits derived from the devices and methods disclosed herein may be achieved with function b) alone, providing that the trainee uses other means to guide appropriate breath training.

During sleep, the wearable smart device detects sleep patterns including apnea and hypopnea events. The processor analyses such patterns and calculates one or more standard sleep related parameters such as, but not limited to, Apnea-Hypopnea Index (AHI) at, for example, either 3% and 4% de-saturation levels, Oxygen Desaturation Index (ODI) at, for example, either 3% and 4% de-saturation levels, and Respiratory Disturbance Index (RDI). Some or all of the sleep data and trainee health-related phenotype data are used to create personalized breath training courses. It is noted that AHI, ODI and RDI have an inverse relationship with sleep quality. In other words, as one or more of AHI, ODI and RDI decreases, sleep quality increases, and vice versa.

A personalised course is completed on a regular schedule, such as daily, during which a portable smart sensing device, for example, the same one used to monitor sleep patterns, measures physiological factors while the trainee performs the breathing exercises. It is also possible for appropriate breathing exercises to be undertaken without the use of a portable device, for example guided by a breathing coach or using other means of instruction.

Throughout this disclosure, targets are used to define values of SDB parameters both when breath training is being undertaken and when no training is in progress. When breath training is being undertaken the SDB parameter is expected to decline so the target is referred to as $V_{lower}$. When no training is being undertaken, the SDB parameter is more likely to increase and therefore targets defined during non-training phases are referred to as $V_{higher}$. $V_{nlower}$ and $V_{nhigher}$ refer to the nth targets set during a full training program for a single trainee.

Breath training is continued through n cycles starting at n=1 until one or more of the sleep related parameters reaches a pre-determined lower value, $V_{nlower}$ Sleep parameters are measured nightly or from time to time even during periods when breath training is performed at a reduced level, or not at all. Should the sleep related parameter(s) reach a pre-determined higher target value $V_{nhigher}$ that indicates further breath training is necessary, a new breath training regimen is created and followed by the trainee until another lower pre-determined target, $V_{2lower}$. For one or more sleep parameters is reached, whereupon the cycle is repeated. Breath training generally improves sleep so that the sleep parameter, AHI, ODI or RDI decreases. When breath training is not undertaken, the sleep parameter, AHI, ODI or RDI may increase until a target $V_{nhigher}$ is reached. If this occurs, then breath training is re-started until a new lower target $V_{nlower}$ s reached.

This disclosure relates to systems, methods, and apparatuses for aiding trainees suffering from sleep disordered breathing (SDB) including sleep apnea and hypopnea, guiding them through breath training intended to reduce or eliminate symptoms of SDB. The daytime training modifies the breathing control centers that control autonomous breathing during sleep by the mechanism of neuroplasticity. In order for neuroplastic changes to be retained for long periods, the exercises are usually undertaken for several weeks for up to or exceeding 20 minutes daily. For some trainees, keeping to this rigorous schedule is a challenge and they may cease the training before the full training schedule is completed. In such cases, it is usual to lose, over time, some or all of the benefit that has accrued. This behavior is exacerbated because significant benefits are experienced within a short time period after training is commenced, which prompts early termination of the training before full neuroplastic modifications have been permanently or semi-permanently acquired.

In order to overcome this problem, breath training may be broken into several short periods of consistent daily or regular exercises which makes compliance to the training easier as the trainee is more able to undertake shorter intense training interspersed with non-training intervals. Usually each subsequent training sequence requires fewer daily sessions than a previous sequence in order to reduce the SDB values as determined by tracking one or more standard sleep related parameters to a satisfactory level.

Regular monitoring of SDB intensity during sleep by some sensing means can determine when training may be stopped and when or if training should re-commence. Using a portable sensing device to monitor sleep patterns enables scheduling and intensity of breath training to be determined and communicated with the trainee.

Figure 2:
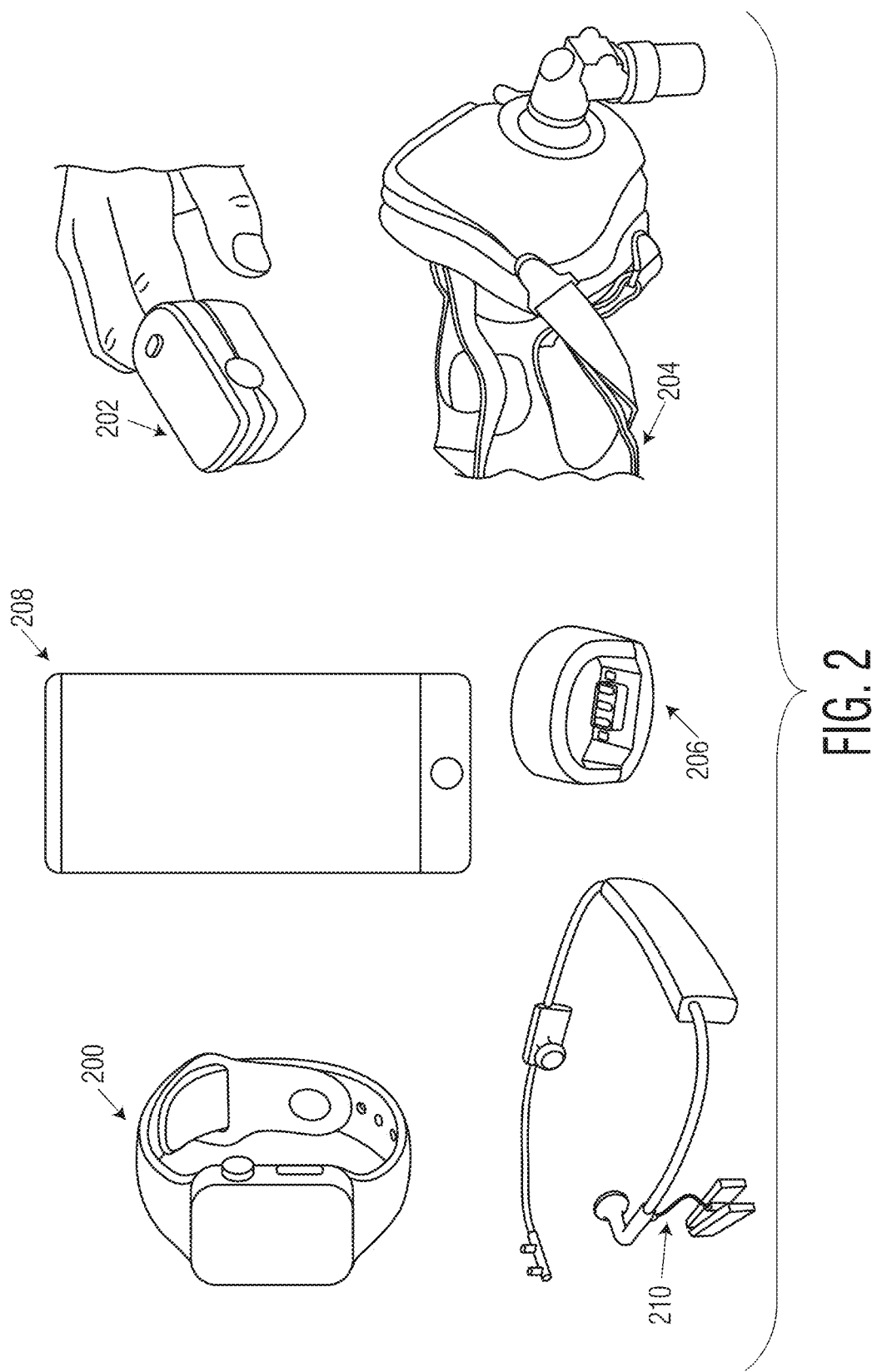
FIG. 2 shows a range of sensing devices, according to an aspect of the disclosure.

In one embodiment a trainee is provided with a wearable sensing means examples (200-206) of which are shown in FIG. 2. Wearable 200 is a wrist worn device referred to as a smart-watch; 202 is a finger-tip device; 204 is a CPAP mask with attached or embedded sensors; 206 is a sensing ring; 208 is a smart-phone; and 210 is a head worn device in which sensor(s) attach to an ear-lobe. As one example, a ring sensor 206 may be worn comfortably during sleep, and also, during breath training. Devices such as those in FIG. 2 can communicate wirelessly to a processor, including mobile processors such as shown in FIGS. 2 (204 and 208) via, for example, Bluetooth™ protocols. The sensors may include camera sensors, heart-rate sensors, blood oxygen saturation ($SpO_2$) sensors, blood pressure sensors, electrocardiogram (ECG) sensors and the like that sense physiological parameters and output corresponding physiological data.

It is noted that the "portable smart device" described throughout the disclosure could be one of, or a combination of a smart-phone and wearable sensors. In one example, the portable smart device could be the smart-phone by itself having a coupled sensor (e.g. camera) that is directly integrated into the smart-phone. In this case, the smart-phone may monitor, for example, heartrate during breath training and/or sleep using the camera or other integrated sensor, and process the data locally or remotely with the aid of a backend server to modify breath training accordingly. In another example, the portable smart device could be the wearable sensor by itself. In this case, the wearable may monitor, for example, heartrate during breath training and/or sleep using the wearable sensor, and process the data locally or remotely with the aid of a backend server to modify breath training accordingly. In yet another example, the portable smart device could be a combination of the smart-phone and an external wearable sensor (e.g. finger-tip device) that is wirelessly coupled to the smart-phone. In this case, the smart-phone and/or the wearable may monitor, for example, heartrate during breath training and/or sleep using the smartphone-sensor and/or the wearable sensor, and process the data locally or remotely with the aid of a backend server to modify breath training accordingly.

In an example embodiment, a wearable sensor and a processor are used for both breath training and for sleep tracking as shown in FIG. 3a. At 300, during sleep, a ring wearable, 106, detects sleep patterns including apnea and hypopnea events and communicates data to a processing device, 204 which processes such data either locally within a sensing device, or a standalone local processor such as a smartphone, or by a processor accessed via the internet infrastructure cloud to provide one or more standard sleep related parameters such as, but not limited to, Apnea-Hypopnea Index (AHI) at either 3% and 4% de-saturation levels, Oxygen Desaturation Index (ODI) at either 3% and 4% de-saturation levels, Respiratory Disturbance Index (RDI). One or more of these parameters are monitored regularly during sleep and tracked over time. It may be beneficial to average these parameters over several consecutive nights, usually between 3 and 5 inclusively in order to mitigate the impact of irregular sleep patterns.

The trainee is assigned to a phenotype classification based on personal health data such as, but not limited to, gender, age, weight, height, fitness level, smoking pattern, allergy symptoms. The number of classifications in the database range between 100 and 500 or more. The sleep data together with the centrally stored trainee phenotype database are used to create a personalized breath training course intended to guide the trainee from the current sleep state to a targeted sleep quality parameter value from AHI, ODI or RDI or another accepted parameter. For example, the sensing device and processor may determine that the trainee has a value of ODI (3%) over three nights of 32 before any breath training, which is in the severe apnea level. In one example, the trainee has provided the following health factors: male, 56 years old, body mass index of 31, complains of snoring, rarely exercises, is a non-smoker, does not suffer from asthma. These factors match the trainee with others in the central phenotype database to select an appropriate personalized breath training course, the expected ODI target to be attained, $V_{nlower}$, where n=1, and the time expected to achieve this target, $T_n$ where n=1. In one example, the ODI target level is selected based on: a) the starting value ODI, 32, and b) time in days, $T_1$, for which the trainee is expected to maintain compliance to the breath training regimen. Such compliance times are based on data collected from previous trainees. Typical times in days for the first training sequence range between 10 to 99 days. $T_1$ may also be chosen by the trainee based on the number of days they will commit to daily training. The training regimen parameters are used to guide the trainee via a mobile device 302 using the sensing device to monitor physiological parameters during breathing training sessions 304. Steps 300-304 may be repeated for 6-12 weeks, 12-20 minutes per day, while ongoing sleep data is used to optimize the training protocols. In this way a single sensing device and processor monitors breathing behaviour and progress during training sessions as well as trends in sleep improvement over time. Training courses can be adjusted during a training course based on these two monitored functions.

FIG. 3b shows a system in an example embodiment in which a wearable sensor and a processor are used only for sleep tracking. At 308, during sleep wearable 206 detects sleep patterns including apnea and hypopnea events and communicates the data to a processing device 310 in FIG. 3b which processes such data either locally on in a processor in the internet infrastructure cloud to provide one or more standard sleep related parameters such as, but not limited to, Apnea-Hypopnea Index (AHI) at either 3% and 4% de-saturation levels, Oxygen Desaturation Index (ODI) at either 3% and 4% de-saturation levels, and Respiratory Disturbance Index (RDI). One of more of these parameters are monitored regularly at night during sleep and tracked over time. As sleep patterns can vary significantly from night to night, it may be beneficial to average these parameters over several consecutive nights, for example between 3 and 5 nights inclusive.

The sleep data together with a central trainee phenotype database is used to create a personalized breath training course intended to guide the trainee from the current sleep state to a targeted parameter value. For example, the sensing device and processor may determine that the trainee has an average value of ODI (3%) over three nights of 27, which is in the moderate category. In this example, the trainee has provided the following health factors: a female, 41 years old, has a body mass index of 27, does not snore, exercises regularly, is a smoker, does not suffer from asthma etc. These factors are used to match the trainee with others in a central phenotype database to select an appropriate personalized breath training course, an expected ODI target to be attained, $V_{1lower}$, and the time expected to achieve this target. $T_1$, similar to those described above. The course parameters are used to guide the trainee not using the same sensing device or processor. Steps 308-312 may be repeated for 6-12 weeks, 12-20 minutes per day, while ongoing sleep data is used to optimize the training protocols.

As a first example of sleep improvement, FIG. 4 shows the reduction in sleep parameter 402 for a diligent trainee that has previously committed to train daily for 120 days, $T_n$ where n=1, following a personalized breath training course 400 commencing with an AHI of 28, which is at the high moderate level, with a target, $V_{nlower}$ where n=1, 404, of AHI=5 which is at the low end of mild apnea. The trainee reaches the target in 84 days before $T_n$ where n=1 of 100 days. The trainee is instructed to stop breath training at that time and requires no more training as the AHI curve 402 shows no increase as measured by the sensing device and processor. Nevertheless, the processor using the phenotype data has set a new target, $V_{nhigher}$ where n=2, 406, of AHI=10. Should trace 402 rise to this target, the trainee would be prompted to undertake a new personalized regimen of breath training. Such a sequence is described in the next example.

As a second example of sleep improvement FIG. 5 shows the reduction in sleep parameter 500 for a reticent trainee following a personalized breath training course for 60 days 502 commencing with an AHI of 27, which is at the high moderate level, with a target, 506, $V_{nlower}$ where n=1, determined using the phenotype database, of AHI=6 which is at the low end of mild SDB. The first training phase length has been set at $T_n$=90 days where n=1. In this example, the trainee stops training after 60 days before reaching the target having decided that the improvement in sleep parameters is sufficient, at which point the user enters an inactive duration where breath training is not performed. The processor, having detected that the trainee has stopped training sets a second target 508 $V_{nhigher}$ where n=2 at AHI=8 averaged over 3 days. This target is detected at day 150 after the inactive duration and the trainee is prompted to follow a new training regimen determined by the central database, 706. A new third target, $V_{nlower}$ where n=3 is set at AHI=5 510. The trainee is instructed to follow a second breath training sequence until target 510 is attained. In this example the second training sequence takes only 20 days 504 which is much less arduous than the first sequence, 502. Thereafter AHI at or below 5 is maintained. Nevertheless, the processor sets a new target, $V_{nhigher}$ where n=4 at 512, of AHI=11. Should trace 500 rise to this target, the trainee will be prompted to undertake a new personalized regimen of breath training. Such a sequence is described in the next example.

Figure 6:
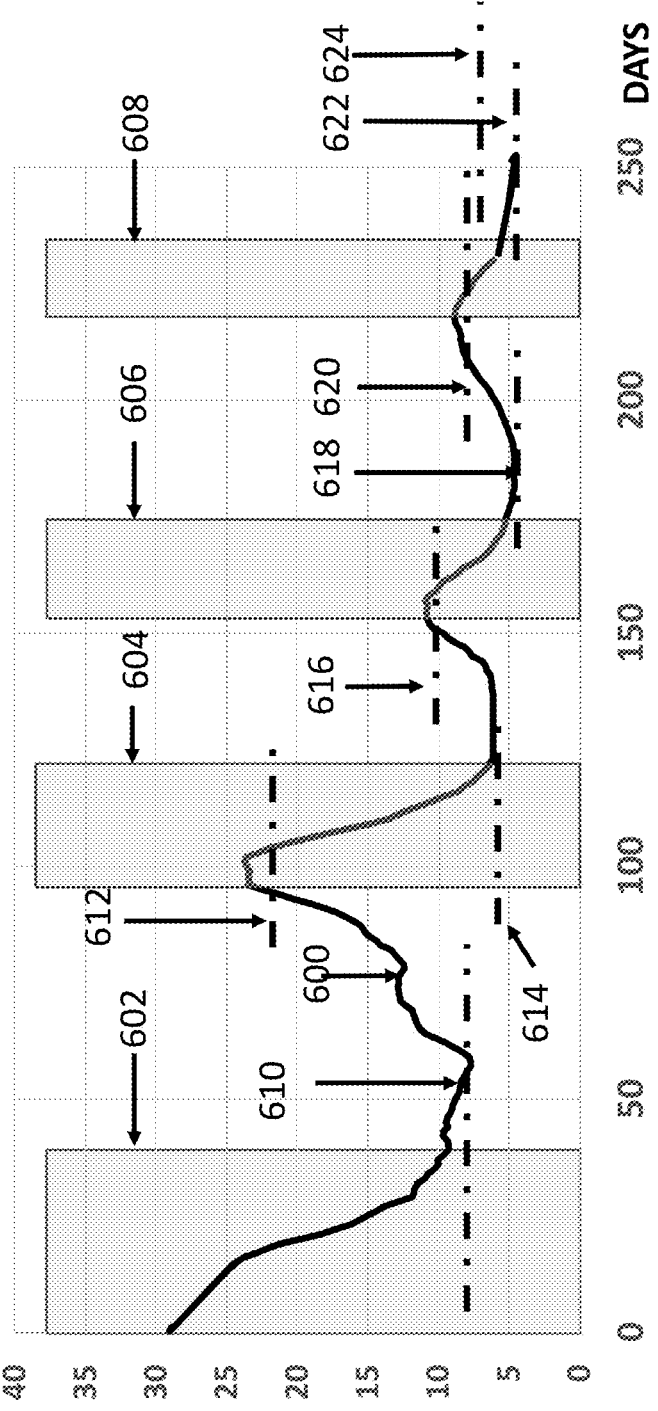
FIG. 6 shows four sequences of reduction in AHI resulting from four sequences of 40, 20, 15 and 10 days of personalized breath training, according to an aspect of the disclosure.

As a third example of sleep improvement FIG. 6 shows the reduction in sleep parameter 600 for a highly reluctant trainee that, although committing to $T_n$=90 days where n=1, following the prescribed personalized breath training course created by the central database, voluntarily stopped training at day 40 indicated by 602. The training commenced with an AHI of 30, which is at the high moderate/low severe level, with a target, $V_{1lower}$ where n=1, at 610, of AHI=8, which is at the middle of mild AHI. The trainee stops training just before reaching the target having decided that the improvement in sleep parameters is sufficient. The processor using the central database, having detected that the trainee has stopped training sets a second target, 612, $V_{2higher}$, of AHI=24 averaged over 3 days. The trainee is monitored during sleep from time to time and reaches the new target at night 100. The processor using the central database determines a new personalized training regimen together with a third target, 614, $V_{nlower}$ where n=3 at AHI=6 614. The trainee is instructed to follow this second breath training sequence until target 614 is attained. The trainee does not voluntarily stop training this time as the target is reached in just 20 days 604 when the trainee is instructed to cease breath training. The cycle is repeated as follows. Based on this trainee's behaviour and phenotype, a fourth target, $V_{nlower}$ where n=4 at AHI=11 616 is determined. When the trainee reaches this target, the trainee is instructed to follow a third personalized breath training sequence until a fifth target, $V_{nlower}$ where n=5, 618, at AHI=5 is attained. The trainee reaches this target in 15 days 606. At this point, the trainee is instructed to cease training. Based on this trainee's behaviour and phenotype a sixth target, $V_{6higher}$ at AHI=8 620 and a new personalized breath training sequence are determined. When the trainee reaches this target, a further breath training sequence is communicated and tracked. A seventh target is determined, $V_{7lower}$ 622 at AHI=5. When the trainee reaches this target (after 10 days in this case), breath training is no longer needed. An eighth target, $V_{8higher}$ 624 at AHI 8, is set to detect whether further training is needed at a later date should AHI rise again.

In this example the second, third and fourth training sequence take only 20, 15 and 10 days which is less arduous than the first sequence of 602. Such tracked sequences of phased breath training for a reluctant trainee provides a support for maintaining compliance so the trainee can derive full benefit, albeit over a longer period in this case for a total elapsed time of 250 days.

It is noted that the lower thresholds (e.g. 404, 506, 510, 610, 614, 618 and 622) may be referred to as stopping thresholds, because they are target thresholds used to stop breath training. Likewise, it is noted that the upper thresholds (e.g. 406, 508, 512, 612, 616, 620 and 624) may be referred to as starting thresholds, because they are target thresholds used to start breath training. Of course, breath training can be voluntarily started and stopped by the user regardless of the upper and lower thresholds.

Figure 7:
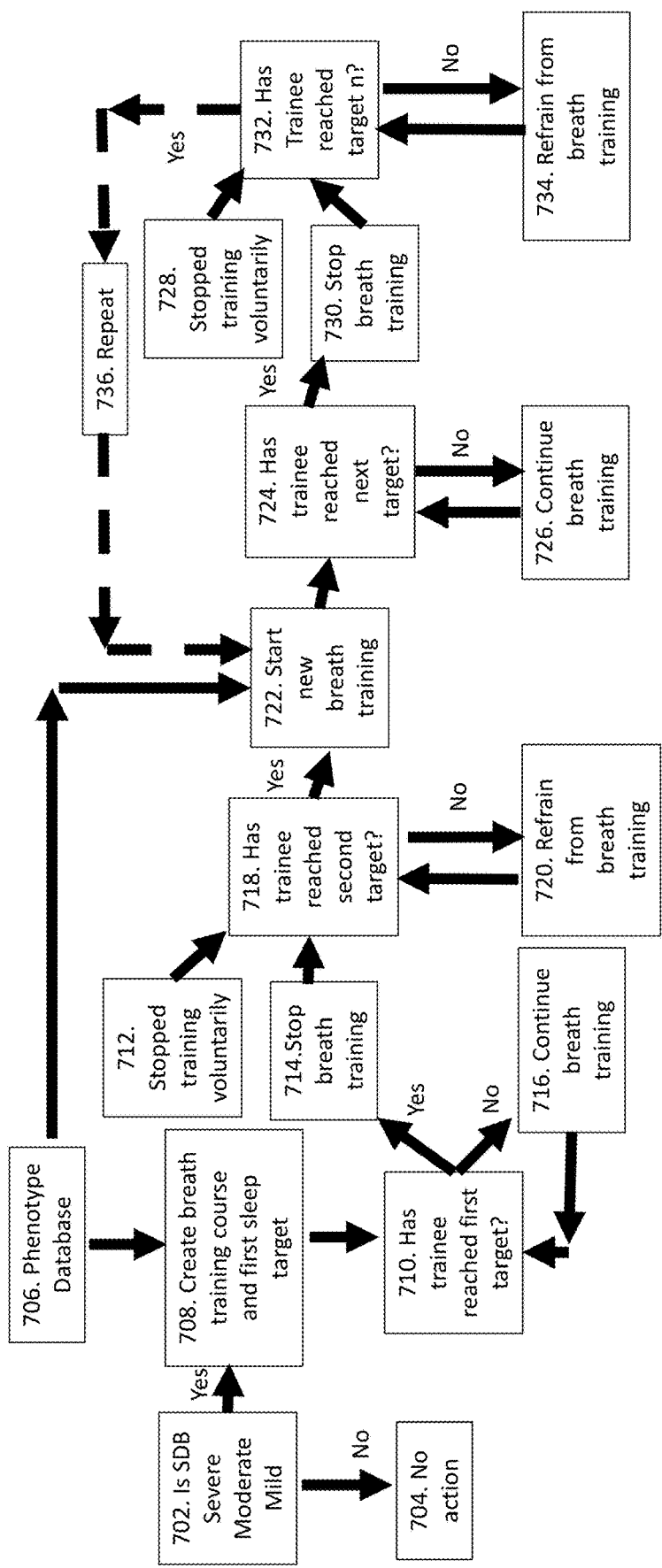
FIG. 7 shows a flow chart for neuroplastic breath training for aiding SDB, according to an aspect of the disclosure.

FIG. 7 is a flow chart illustrating the overall sequence of steps in a generalized neuroplastic breath training process. Step 702 determines initially whether or not an individual is suffering from SDB and the intensity of the suffering based on standard scales such as AHI, ODI or RDI as defined above, or other suitable defining scales for SDB intensity. If the value is below that requiring alleviation, a 'no' decision is made and breath training in not invoked in step 704. Typically the 'no/yes' decision is when AHI or ODI is at least 5. The individual may continue to monitor sleep parameters from time to time and if one or more sleep parameters averaged over 3-5 days or more indicate need for breath training, the procedure in the next paragraph may be invoked.

If, at step 702 a 'yes' decision is indicated, the individual provides personal data sufficient to determine their phenotype as applied to breathing health. Such data may include gender, height, weight, level of exercise, smoking activity, anxiety level, allergies, etc. The individual is assigned a phenotype category from a database in step 706, that relates breathing phenotypes to the most appropriate initial and subsequent breath training regimens in step 708 and in step 722, together with a first target, $V_{nlower}$ where n=1, to be attained for the chosen SDB parameter such as AHI, ODI, RDI or other suitable parameter.

A look-up table, such as the table shown in FIG. 8, is used to determine the first target AHI, $V_{nlower}$ where n=1. Look-up tables are stored in a central database in step 706, derived from past training data determined from similar phenotypes. Reduction of AHI and other relevant sleep parameters using breath training methods aimed at neuroplastic modification of the autonomic breathing control centers in the brain follow a quasi-logarithmic trend curve reaching a final asymptotic value in 12-16 weeks as show in FIG. 1 curve 100. Based on this, the first target to define the aim of the first breath training sequence, $V_{nlower}$ where n=1, for AHI can be calculated taking into account the start AHI and a time expectation of a selected number of weeks, for example 6 weeks, in which time the change in AHI should reach the values in the look-up table if the trainee responds well to breath training and is diligent in following the training regimen on a regular schedule.

The trainee undertakes training with the SDB parameter being tracked nightly or from time to time. If the first target, $V_{nlower}$ where n=1 has not been attained in step 710, breathing training is continued in step 716. If and when, the first target, $V_{nlower}$ where n=1, is attained in step 710 breath training is discontinued in step 714). However, the trainee may have stopped breath training voluntarily prior to the first target being attained in step 712. The trainee may be less than diligent, or might mistakenly determine that full benefit has accrued. In all cases, in step 712 and in step 714, the SDB may continue to be monitored nightly or from time to time until the second defined SDB parameter target $V_{nhigher}$ where n=2 is detected in step 718.

Until the second target $V_{nhigher}$ where n=2, is attained, the trainee may refrain from breath training in step 720. When and if the second target is attained, the trainee recommences breath training in step 722, using the same training protocol or a new protocol defined by the phenotype database in step 706. The cycle may then be repeated invoking a third target, $V_{nlower}$ where n=3, via steps 724, 726, 728, 730, 736, and then, if required through targets 4-n, 732 until the nth target is not attained and the trainee refrains from training in step 734.

In practice, the number of nights between reaching targets $V_{nhigher}$ for n–(n+1) increase significantly as the neuroplastic modifications become permanent, or at least semi-permanent. At this stage tracking of the SDB parameters may be performed at longer intervals say between 30 and 90 days, when breath training may, in some cases, be needed to reach the last recorded target, $V_{nlower}$, attained.

Figure 9:
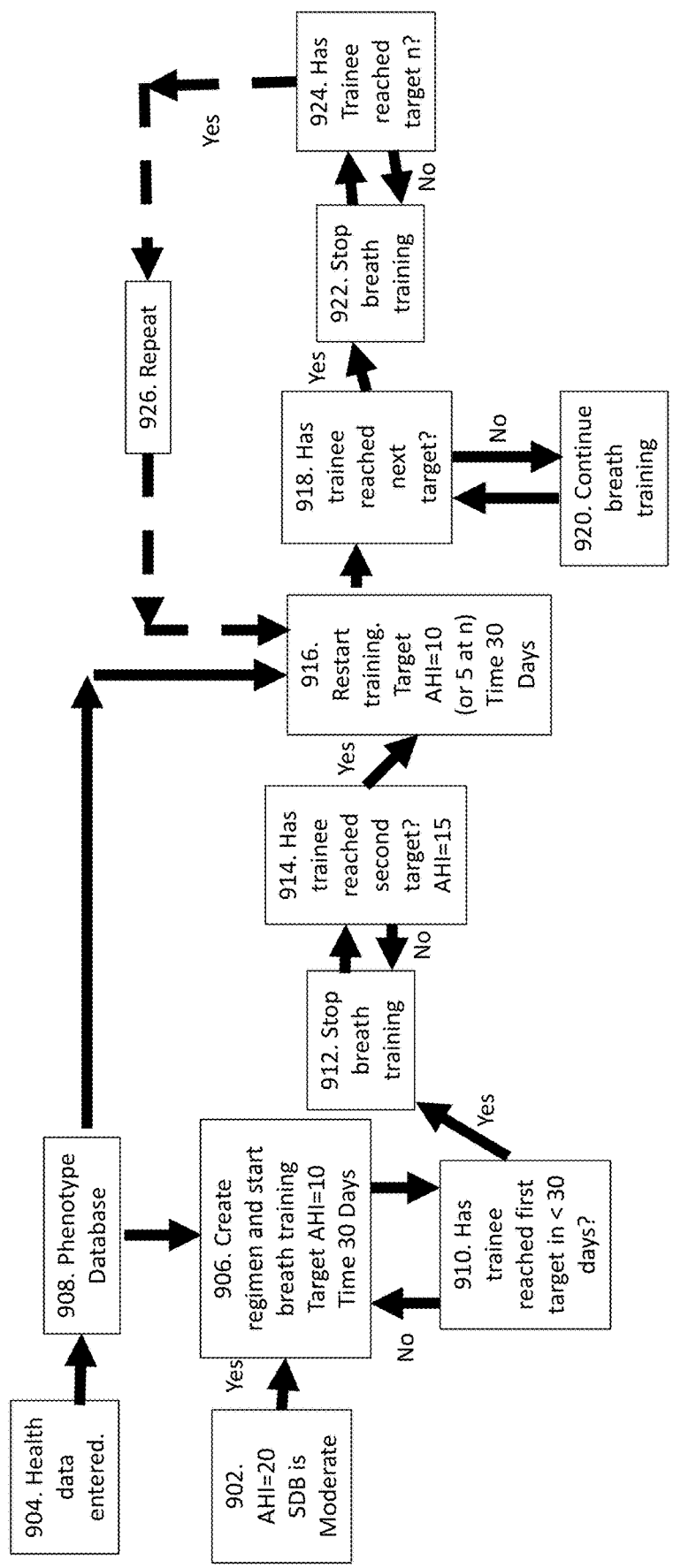
FIG. 9 shows a flow chart for a neuroplastic breath training sequence, according to an aspect of the disclosure.

FIG. 9 illustrates an example of one complete training course from initiation until the trainee does not reach the last $V_{nhigher}$ and therefore requires no further breath training. Prior to the training, the trainee has been tested for SDB and determined to have a moderate level of sleep apnea with AHI=20, at 902. The trainee has provided personal health information in step 904, which is stored in the phenotype database in step 908. The database in step 908, creates a personalized breath training course in step 906 with a first sleep target, $V_{1lower}$, to reduce down to AHI=10 and a time for the first phase of training, $T_1$, of 30 days. In one example, the trainee is diligent and does not voluntarily stop breath training and reaches the first target of AHI=10 determined in step 910 by averaging values over three consecutive nights, on day 21 and is instructed to stop training at step 912. The trainee continues to be monitored nightly for AHI and if at step 914, and the AHI value has risen from AHI=10 to the second target, $V_{2higher}$, of AHI=15, averaged over three consecutive nights. If it is determined in step 910 that the trainee does not reach the first target of AHI=10 in less than 30 days, then training continues at step 906. The second phase of training commences using the same or a new breath training regimen created by the phenotype database in step 908. A third target, $V_{3lower}$, is set at AHI=10 (or 5), with a time of 30 days of training at step 916. The trainee is tracked regularly and instructed to continue following the breath training regimen until the third target is reached at step 918 and step 920. When the third target, AHI=10 is reached averaged over three nights, which occurs after 18 nights, the trainee is instructed to stop breath training at step 922. A new upper target, $V_{4higher}$, is set at AHI=15 and the cycle is repeated if necessary, n times until AHI at cycle n remains below the nth target value, typically AHI<5 for at least 30 nights, at steps 924 and 926. Thereafter the nth cycle may be repeated if and when AHI exceeds 5 averaged over 3 nights. It is noted that the specific values (e.g. AHI, Time, etc.) shown in FIG. 9 are merely examples and that the algorithm is not limited to the values shown.

FIG. 10 shows a sequence of steps that is used to alleviate or eliminate the symptoms of SDB using the methods of neuroplasticity. The principal is to replicate the apnea or hypopnea events experienced during sleep while in the awake state. An intermittent sequence of breath holding is interspersed by periods of relaxed and slow breathing. During training, the trainee gradually increases the length of the breath holding periods and reduces the natural breathing frequency when instructed. Over time the trainee is also instructed to make the transitions between the breath hold and the relaxed breathing without gasping or over breathing. Repeating these sequences daily for between 15 and 30 minutes for a period of 6-12 weeks creates neuroplastic changes in the autonomous breathing control center in the brain. For example, Step 1: Breathe normally for 3 minutes. Try to keep the mouth closed; Step 2: Breathe normally, then when prompted hold the breath after exhaling until the first clear urge to breathe is felt. Then take the first breath in through the nose calmly. Try not to gasp. (This is a self-imposed hypoxic event); Step 3: Breathe normally for approximately five minutes, until prompted to hold the breath after breathing out. Hold the breath until the first clear urge to breathe is felt. Then take the first breath through the nose calmly. Try not to gasp. (This is the second self-imposed hypoxic event); Step 4: From normal breathing, when prompted, gradually slow down until breathing is as slow as comfortable. Aim for about 6 breaths per minute. Count in for 4 seconds and out for 6 seconds; Step 5: From slow breathing, exhale, hold the breath until a strong need to breathe is felt. (This is the third self-imposed hypoxic event); Step 6: Repeat steps 3,4,5 in sequence 2 or 3 times; and Step 7: Breathe normally for 3 minutes to relax. Keep the mouth closed.

When an apnea or hypopnea event onsets during sleep, this center is now programmed to detect the event upon initiation and trigger a return to normal breathing before the SDB event exacerbates into a repetitive cycle of SDB typical of sleep apnea and other SDB modalities. The method is referred to Minimal Intermittent Hypoxia, (MIH). Within this training regimen, the periods of active prompted training and non-training are determined by the compliance behavior of the trainee as disclosed in this document. In addition, the training may be further personalized based on trainee phenotype, ability of the trainee to perform the exercises and tracked progress.

While the foregoing is directed to example embodiments described herein, other and further example embodiments may be devised without departing from the basic scope thereof. For example, aspects of the present disclosure may be implemented in hardware or software or a combination of hardware and software (e.g. processors, memory devices, electronic circuits, and the like of the PAP device, sensors, smartphone, servers, etc.). One example embodiment described herein may be implemented as a program product for use with a computer system. The program(s) of the program product define functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed example embodiments, are example embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A portable smart device comprising:
a wearable sensor configured to sense a physiological parameter of a user during breath training and during an inactive duration where breath training is not performed and wirelessly transmit the sensed physiological parameter;
a display; and
a processor configured to:
perform a breath training session by:
displaying instructions on the display to the user to breathe in a specified manner,
wirelessly receiving physiological data from the sensor, the physiological data representing the sensed physiological parameter of the user,
determining a breathing quality based on the physiological data from the sensor, and
stopping the breath training session when the breathing quality reaches a breath training session stopping threshold, and
evaluate initiation of a further breath training session by:
detecting that the user has voluntarily stopped the breath training session before reaching the breath training session stopping threshold,
continuing to wirelessly receive the physiological data from the sensor during the inactive duration where breath training is not performed, and
when the physiological data during the inactive duration indicates that the breathing quality reaches a breath training session starting threshold, initiating a subsequent breath training session by displaying an alert to the user and displaying instructions to the user on the display to breathe in a specified manner, wherein the subsequent breath training session has a shorter duration than the breath training session.

2. The portable smart device of claim 1, wherein the sensor is at least one of a heart rate sensor or a blood oxygen saturation sensor.

3. The portable smart device of claim 1, wherein the processor is further configured to decrease the breath training session stopping threshold and the breath training session starting threshold each time the breath training session is repeated.

4. The portable smart device of claim 1, wherein the processor is further configured to decrease a duration of the subsequent breath training session each time the breath training session is repeated.

5. The portable smart device of claim 1, wherein the processor is further configured to perform the breath training session by instructing the user to breathe in a specified manner by performing breath holds and rhythmic breathing patterns.

6. The portable smart device of claim 1, wherein the processor is further configured to determine a length of the inactive duration between the breath training sessions, determine a decrease in the breathing quality indicated by the physiological data, set a duration of the breath training session, set the breath training session stopping threshold, and set the breath training session starting threshold based on at least one of the length of the inactive duration between breath training sessions and the measured decrease in the breathing quality indicated by the physiological data.

7. The portable smart device of claim 1, wherein the processor is further configured to determine a phenotype classification of the user based on the physiological data, set a duration of the breath training session, set the breath training session stopping threshold, and set the breath training session starting threshold based on the phenotype classification of the user.

8. The portable smart device of claim 1, wherein the processor is further configured to compute the breathing quality as an Apnea-Hypopnea Index (AHI), Oxygen Desaturation Index (ODI), or a Respiratory Disturbance Index (RDI) based on the physiological data from the sensor.

* * * * *